United States Patent
Harris (10) Patent No.: US 12,185,869 B2
(45) Date of Patent: Jan. 7, 2025

(54) COOKING VESSEL LID AND FAN SYSTEM

(71) Applicant: Leah Harris, Las Vegas, NV (US)

(72) Inventor: Leah Harris, Las Vegas, NV (US)

(*) Notice: Subject to any disclaimer, the term of this patent is extended or adjusted under 35 U.S.C. 154(b) by 0 days.

(21) Appl. No.: 17/527,168

(22) Filed: Nov. 16, 2021

(65) Prior Publication Data

US 2022/0151429 A1    May 19, 2022

Related U.S. Application Data

(60) Provisional application No. 63/205,081, filed on Nov. 16, 2020.

(51) Int. Cl.
*A47J 36/06* (2006.01)
*A47J 36/38* (2006.01)
*A47J 37/10* (2006.01)
*B65D 51/16* (2006.01)
*B65D 51/24* (2006.01)

(52) U.S. Cl.
CPC ............ *A47J 36/06* (2013.01); *A47J 36/38* (2013.01); *A47J 37/101* (2013.01); *B65D 51/1683* (2013.01); *B65D 51/242* (2013.01); *B65D 51/248* (2013.01)

(58) Field of Classification Search
CPC .......... A47J 36/06; A47J 36/38; A47J 37/101; B65D 51/1683; B65D 51/242; B65D 51/248
USPC ...................................................... 220/212.5
See application file for complete search history.

(56) References Cited

U.S. PATENT DOCUMENTS

| | | | | | |
|---|---|---|---|---|---|
| 4,091,956 A | * | 5/1978 | Vecchio | ............... | A47J 36/06 |
| | | | | | 220/369 |
| 6,105,811 A | * | 8/2000 | Alfred | .................. | A47J 36/06 |
| | | | | | 220/912 |
| D931,036 S | * | 9/2021 | Chimbuya | ................. | D7/360 |

(Continued)

FOREIGN PATENT DOCUMENTS

| | | | | |
|---|---|---|---|---|
| AU | 2019100701 A4 | * | 8/2019 | |
| CN | 107669139 A | * | 2/2018 | |
| DE | 202008012826 U1 | * | 1/2009 | ............ A47J 36/06 |

(Continued)

OTHER PUBLICATIONS

English Machine Translation of CN-107669139-A (Year: 2018).*

(Continued)

*Primary Examiner* — Don M Anderson
*Assistant Examiner* — Laura E. Parker
(74) *Attorney, Agent, or Firm* — Jacob M. Ward; Ward Law Office LLC (57) ABSTRACT

A cooking vessel lid and fan system; the cooking vessel lid and fan system includes a cooking vessel lid sized and configured to cover a top portion of a host cooking vessel such as a pot, a pan, a broiler, or a casserole dish. The cooking vessel lid includes an internal fan, a vent system, an internal power source, a power switch, and a handle projecting from a top-center plane of the cooking vessel lid. The internal fan and the vent system work in combination to eliminate excess heat contained within the host cooking vessel during use. The cooking vessel lid and fan system quickly draws heat from the host cooking vessel, lowering temperatures of food contents, to ensure the food contents can be quickly served and enjoyably consumed at a desired temperature.

18 Claims, 6 Drawing Sheets

(56) References Cited

U.S. PATENT DOCUMENTS

| | | | |
|---|---|---|---|
| 2004/0069154 A1* | 4/2004 | Stefanoni | A47J 36/06 99/403 |
| 2018/0035842 A1* | 2/2018 | Stumphauzer | A47J 36/06 |

FOREIGN PATENT DOCUMENTS

| | | | | | |
|---|---|---|---|---|---|
| DE | 202016002911 | U1 | * | 9/2017 | |
| DE | 102019127684 | B3 | * | 2/2021 | |
| GB | 2386052 | A | * | 9/2003 | A47J 27/08 |
| KR | 20080109317 | A | * | 12/2008 | |

OTHER PUBLICATIONS

English Machine Translation of DE-102019127684-B3 (Year: 2021).*
English Machine Translation of KR-20080109317-A (Year: 2008).*
"Food Processor—Cordless Mini Electric Food Chopper," retrieved from https://www.amazon.com/dp/B0823N8T35, available at least as early as Nov. 22, 2019. (Year: 2019).*
English Machine Translation of DE-202016002911-U1 (Year: 2017).*
English Machine Translation of CN107669139 (Year: 2018).*
English Translation of KR-20080109317-A (Year: 2008).*
English Machine Translation of DE-202008012826-U1 (Year: 2009).*

* cited by examiner

COOKING VESSEL LID AND FAN SYSTEM

CROSS-REFERENCE TO RELATED APPLICATION(S)

The present application is related to and claims priority to U.S. Provisional Patent Application No. 63/205,081 filed Nov. 16, 2020, which is incorporated by reference herein in its entirety.

BACKGROUND OF THE INVENTION

The following includes information that may be useful in understanding the present disclosure. It is not an admission that any of the information provided herein is prior art nor material to the presently described or claimed inventions, nor that any publication or document that is specifically or implicitly referenced is prior art.

TECHNICAL FIELD

The present invention relates generally to the field of lids of existing art and more specifically relates to cooking vessel and container lids.

RELATED ART

Just like a cold beverage shouldn't be served frozen, a hot meal shouldn't be served scalding hot. Not only does it affect the taste of the food, but it affects the tongue's taste buds, as well, completely desensitizing them. Serving food too hot can even painfully harm the tongue, the lips, gums, inner cheeks, throat and stomach, too. Unfortunately, though, serving at too-high temperatures is quite common, and not just in private homes but in restaurants, as well. A suitable solution is desired.

U.S. Pat. No. 5,065,889 to Rino Conti relates to a covered dish with vent. The described covered dish with vent includes a casserole dish and cover that cooperate to allow cooking in a vented and unvented condition as well as a controlled transition from a vented to an unvented state. The dish includes a cam ledge and the cover includes a lip that is rotatable and pivotable on the cam ledge to allow controlled venting and access to the interior of the dish.

SUMMARY OF THE INVENTION

In view of the foregoing disadvantages inherent in the known cooking vessel and container lid art, the present disclosure provides a novel cooking vessel lid and fan system. The general purpose of the present disclosure, which will be described subsequently in greater detail, is to provide a cooking vessel lid and fan system.

A cooking vessel lid and fan system is disclosed herein. The cooking vessel lid and fan system includes a cooking vessel lid sized and configured to cover a top portion of a host cooking vessel such as a pot, a pan, a broiler, or a casserole dish. The cooking vessel lid includes an internal fan, a vent system, an internal power source, a power switch, a power indication light, a charging port, and a handle projecting from a top-center plane of the cooking vessel lid. The internal fan and the vent system work in combination to effectively eliminate excess heat contained within the host cooking vessel during use. The cooking vessel lid and fan system quickly draws heat from the host cooking vessel, lowering temperatures of food contents, to ensure the food contents can be quickly served and enjoyably consumed at a desired temperature. The cooking vessel lid and fan system may also be arranged as a kit including a set of instructions and a charging cable.

A method of use is further disclosed including the steps of: step one, providing a cooking vessel lid sized and configured to cover a top portion of the host cooking vessel, the cooking vessel lid comprising an internal fan configured to eliminate excess heat contained within the host cooking vessel during use, a vent system, an internal power source configured to power the internal fan of the cooking vessel lid, a power switch for activation and deactivation of the internal fan, and a handle; step two, applying the cooking vessel lid to the host cooking vessel; step three, activating the internal fan; step four, charging the internal power source; and step five, removing the cooking vessel lid from the host cooking vessel.

For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and methods of use for the present disclosure, a cooking vessel lid and fan system, constructed and operative according to the teachings of the present disclosure.

The various embodiments of the present invention will hereinafter be described in conjunction with the appended drawings, wherein like designations denote like elements.

DETAILED DESCRIPTION

As discussed above, embodiments of the present disclosure relate to a cooking vessel and container lid and more particularly to a cooking vessel lid and fan system as used to improve temperature control of food items contained within cooking vessels.

Generally, the cooking vessel lid and fan system includes a cooking vessel lid for use with pots, pans, and casserole dishes which features an internal fan and vent system for rapid cooling down of food items for consumption. The cooking vessel lid and fan system can be made for use with many varieties of cooking vessels, including but not limited to pots, pans, and broilers, and in various sizes in each format, including commercial-use sizes. The cooking vessel lid further includes an internal power source, a power switch, a power indication light, a charging port, and a handle. The cooking vessel lid and fan system helps food items quickly convert from cooking temperature to serving temperature.

In a preferred embodiment, the cooking vessel lid comprises a round profile having two levels, preferably made of stainless steel, for application on a host cooking vessel of a matching diameter. A handle projects from the top-center plane. Featured in strategic locations throughout the lid are apertures used for venting. Near a center of the cooking vessel lid, below the handle, is an internal fan, placed in position to draw air away from an interior of the host cooking vessel. Contained within an insulated compartment of the cooking vessel lid is a rechargeable battery. The rechargeable battery connects by wire to the internal fan. On the top-level of the lid is a charging port. A power cable is included for attachment to the charging port. A power switch is provided near the charging port and is included to generate activity of the internal fan.

In alternative embodiments, the cooking vessel lid and fan system may include a thermometer integrated within the cooking vessel lid. The thermometer may measure temperature such as an actual temperature of food contents in the host cooking vessel. The internal fan of the cooking vessel lid and fan system may operate at different speeds, and may have set variations in speed that can be selected by an included control device. The cooking vessel lid and fan system may be provided in a single plane format, in which the internal fan is positioned on the bottom and the internal battery, as well as wiring connecting the battery to the fan, is enclosed upon the top.

A user may simply ensure the internal battery of the cooking vessel lid and fan system is charged, and then apply it to a host cooking vessel in which food items are being prepared. By turning on the internal fan, excess heat in the cookware, as well as excess heat in the food being prepared in the cookware, will be withdrawn by the internal fan. The food item may then be immediately served at a proper and desirable temperature, eliminating service delays, and without risk of harming a consumer of the food item. The cooking vessel lid and fan system effectively eliminates burns to the lips, interior cheeks, gums, roof of the mouth, and tongue.

Referring now more specifically to the drawings by numerals of reference, there is shown in FIGS. 1-5, various views of a cooking vessel lid and fan system 100.

Figure 1:
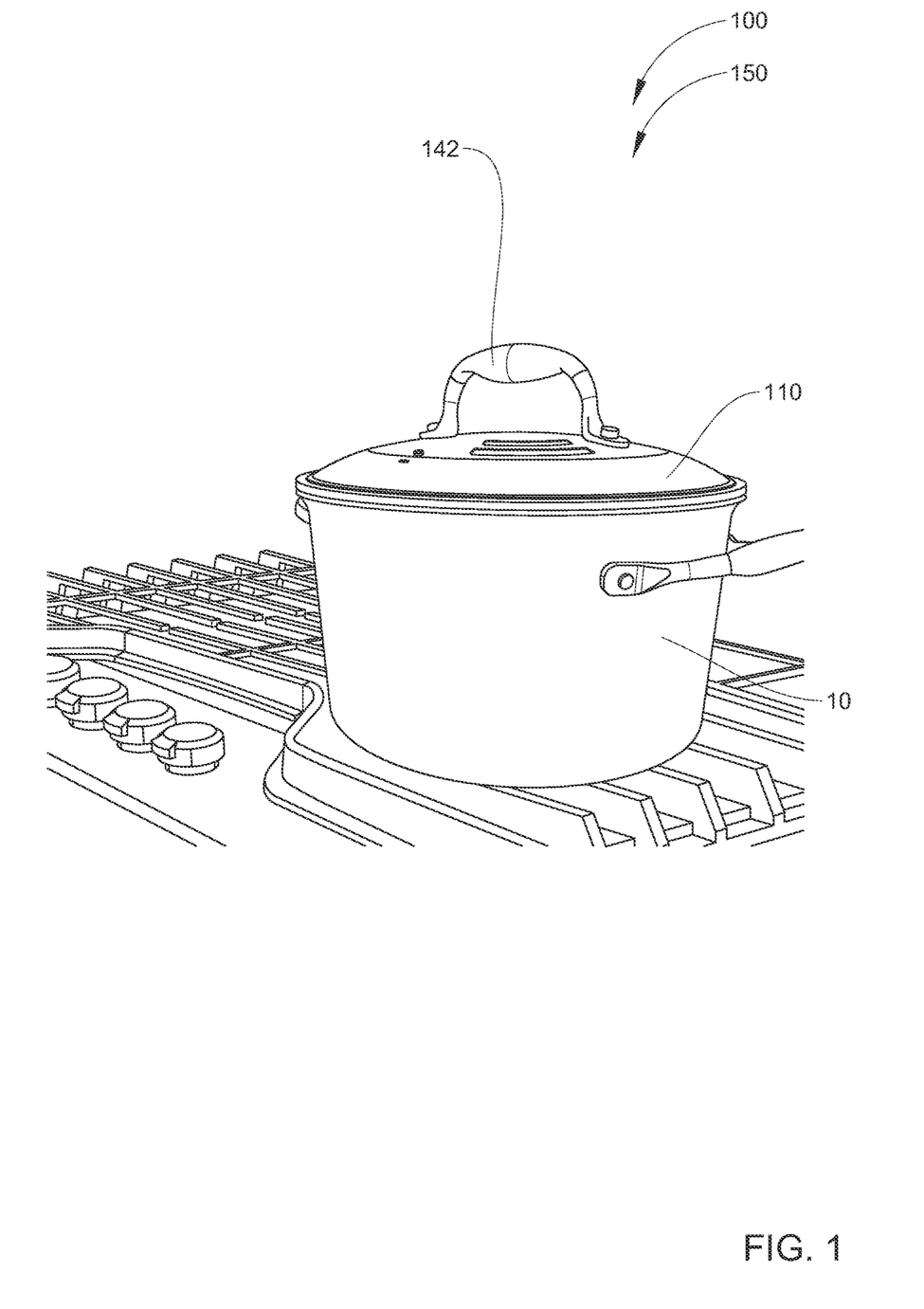
FIG. 1 is a perspective view of the cooking vessel lid and fan system during an 'in-use' condition, according to an embodiment of the disclosure.

FIG. 1 shows a cooking vessel lid and fan system 100 during an 'in-use' condition 150, according to an embodiment of the present disclosure. Here, the cooking vessel lid and fan system 100 may be beneficial for use by a user to rapidly cool down food items contained within a host cooking vessel 10. As illustrated, the cooking vessel lid and fan system 100 may include a cooking vessel lid 110 sized and configured to cover a top portion of the host cooking vessel 10. The cooking vessel lid 110 comprises an internal fan 112, a vent system 118, an internal power source 130, a power switch 138, and a handle 142 projecting from a top-center plane of the cooking vessel lid 110. The internal fan 112 and the vent system 118 work in combination to eliminate excess heat contained within the host cooking vessel 10 during use. The cooking vessel lid and fan system 100 may be used with a plurality of cooking vessels including but not limited to a pot, a pan, a broiler, and a casserole dish. The cooking vessel lid and fan system 100 quickly draws heat from the host cooking vessel 10, lowering temperatures of food contents, to ensure the food items can be quickly served and enjoyably consumed at a desired temperature.

Figure 2:
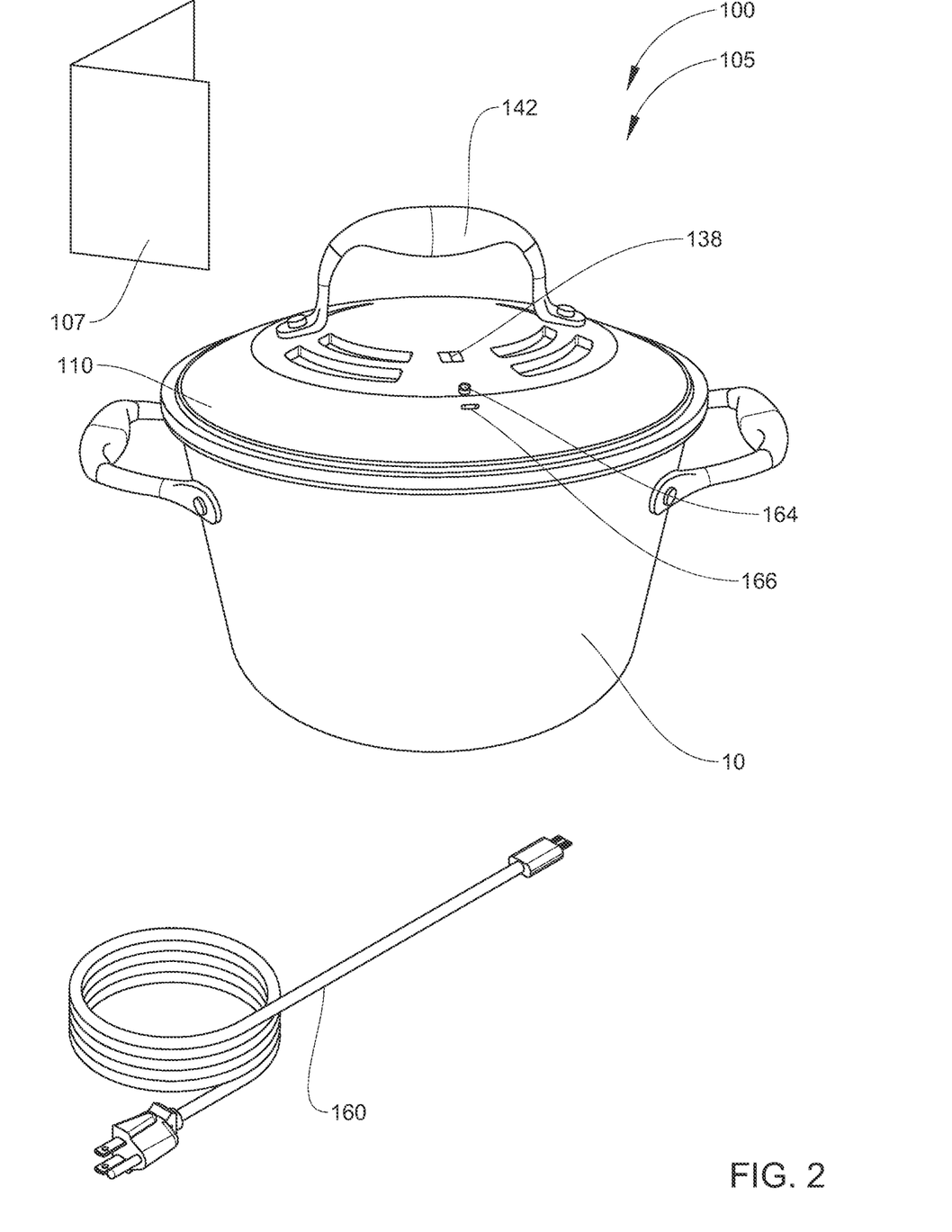
FIG. 2 is a perspective view of the cooking vessel lid and fan system of FIG. 1, according to an embodiment of the present disclosure.

As shown in FIG. 2, according to one embodiment, the cooking vessel lid and fan system 100 may be arranged as a kit 105. In particular, the cooking vessel lid and fan system 100 may further include a set of instructions 107 and a charging cable 160. The instructions 107 may detail functional relationships in relation to the structure of the cooking vessel lid and fan system 100 such that the cooking vessel lid and fan system 100 can be used, maintained, or the like, in a preferred manner.

Figure 3:
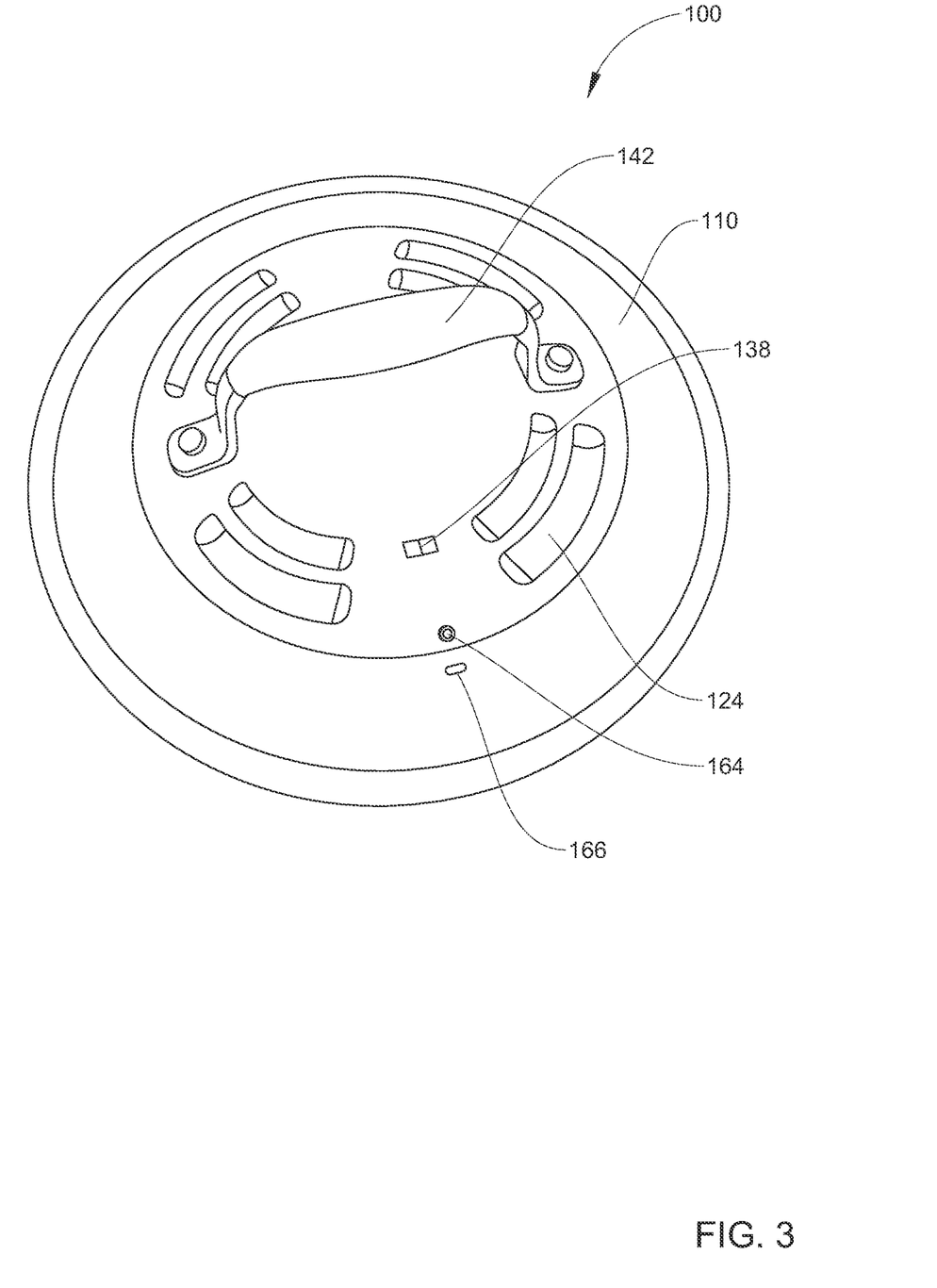
FIG. 3 is a top perspective view of the cooking vessel lid and fan system of FIG. 1, according to an embodiment of the present disclosure.

FIG. 3 is a top perspective view of the cooking vessel lid and fan system 100 of FIG. 1, according to an embodiment of the present disclosure. As above, the cooking vessel lid and fan system 100 may include the cooking vessel lid 110 comprising the internal fan 112, the vent system 118, the internal power source 130, the power switch 138, and the handle 142. The internal power source 130 is configured to power the internal fan 112 of the cooking vessel lid 110. The power switch 138 for activation and deactivation of the internal fan 112. The power switch 138 is positioned on an exterior portion of the cooking vessel lid 110. The cooking vessel lid 110 further includes a power indication light 164 configured to illuminate when the cooking vessel lid 110 is activated. In a preferred embodiment, the internal power source 130 includes a rechargeable battery. The cooking vessel lid 110 further includes a charging port 166 for charging the rechargeable battery using the charging cable 160. In certain embodiments, the cooking vessel lid and fan system 100 may use replaceable batteries instead of the rechargeable battery. The vent system 118 is comprised of a series of air vents configured to exhaust heat during use. More specifically, the series of air vents includes a bottom air suction vent 122 and at least one top-vent 124. The at least one top-vent 124 is positioned on a top portion of the cooking vessel lid 110 and the bottom air suction vent 122 is positioned on a bottom portion of the cooking vessel lid 110. The cooking vessel lid and fan system 100 may include a various number of vents in various sizes and in various locations on cooking vessel lid 110.

Figure 4:
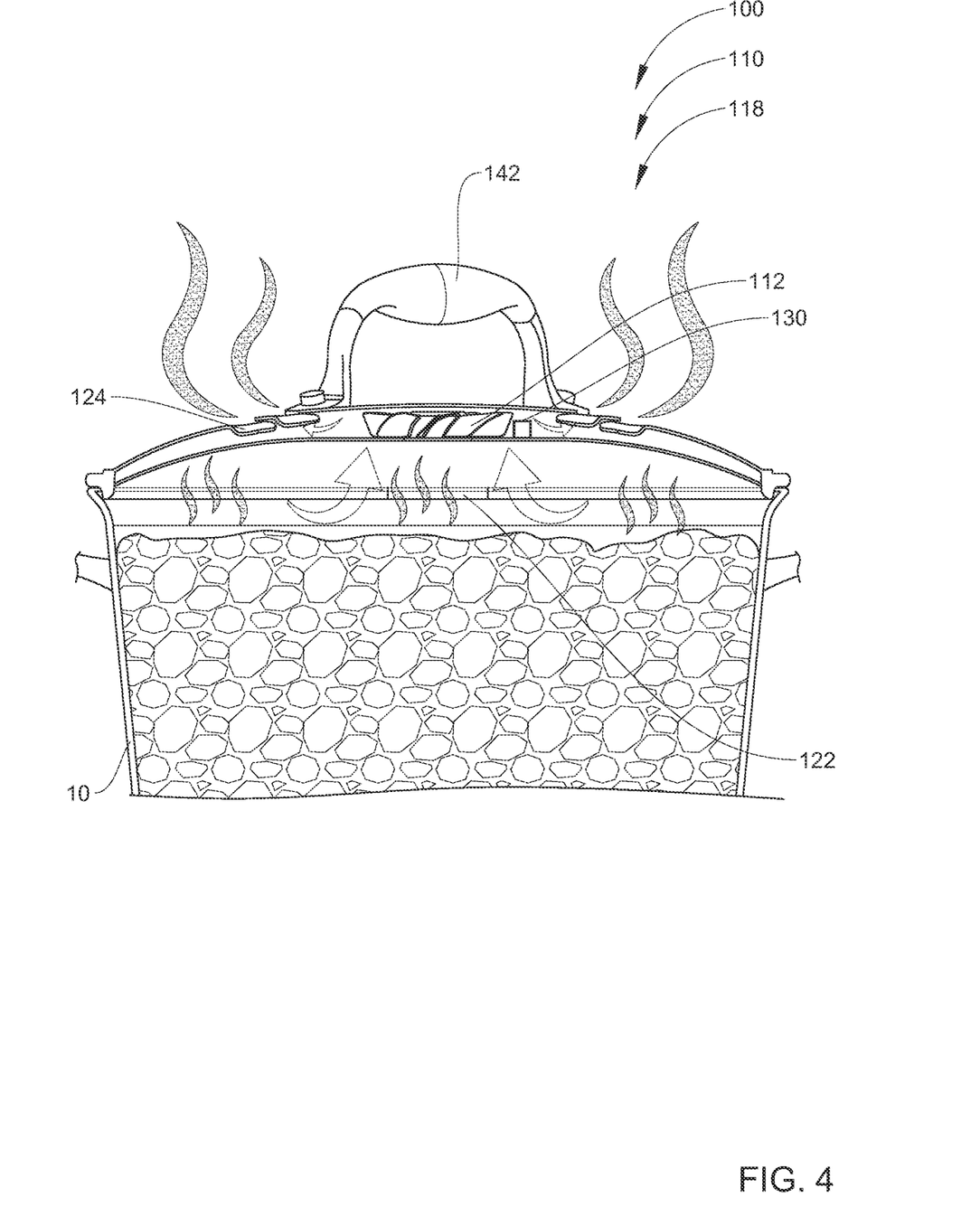
FIG. 4 is a cutaway view of the cooking vessel lid and fan system of FIG. 1, according to an embodiment of the present disclosure.

FIG. 4 is a cutaway view of the cooking vessel lid and fan system 100 of FIG. 1, according to an embodiment of the present disclosure. As shown the cooking vessel lid and fan system 100 includes the cooking vessel lid 110 comprising the internal fan 112, the vent system 118, the internal power source 130, the power switch 138, and the handle 142. The cooking vessel lid 110 is configured to circulate heat and rapidly cool down food contained within a host cooking vessel 10. When activated, the internal fan 112 provides suction of heat from an interior of the host cooking vessel 10 and the heat is exhausted through the vent system 118. The cooking vessel lid 110 includes an internal cavity positioned between the top portion of the cooking vessel lid 110 and the bottom portion of the cooking vessel lid 110. The internal power source 130 is hosted within an insulated internal compartment of the cooking vessel lid 110. In a preferred embodiment, a substantial portion of the cooking vessel lid 110 comprises stainless steel. The cooking vessel lid and fan system 100 can be made of various materials of applicability, including but not limited to stainless steel, copper, aluminum, and anodized aluminum. The cooking vessel lid and fan system 100 can also be made in ceramic formats.

Figure 5:
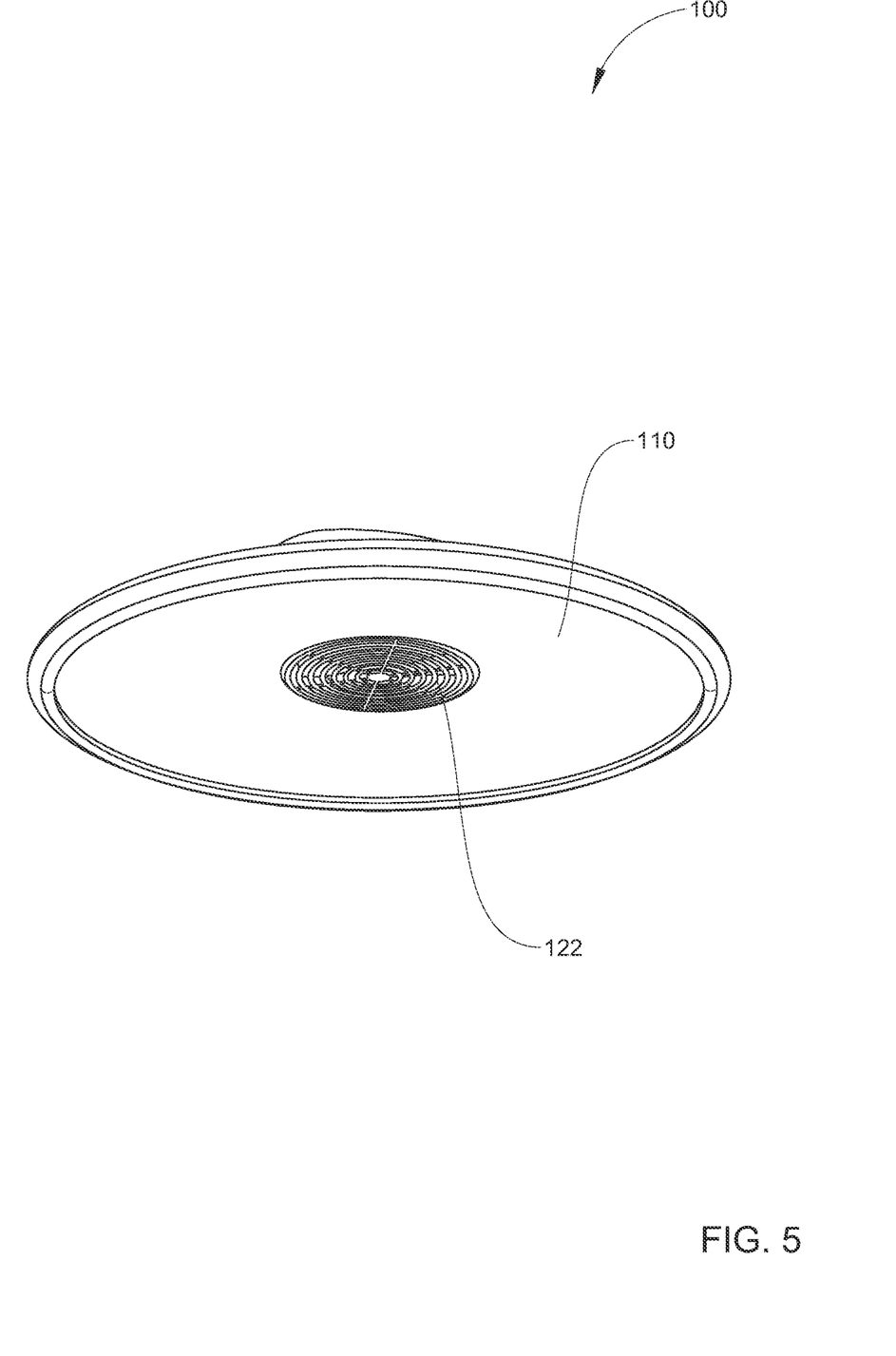
FIG. 5 is a bottom perspective view of the cooking vessel lid and fan system of FIG. 1, according to an embodiment of the present disclosure.

FIG. 5 is a bottom perspective view of the cooking vessel lid and fan system 100 of FIG. 1, according to an embodiment of the present disclosure. As above, the vent system 118 includes a series of air vents configured to exhaust heat during use. The bottom air suction vent 122 is in alignment with the internal fan 112 and positioned on the bottom portion of the cooking vessel lid 110. The cooking vessel lid and fan system 100 ensures that food items can be safely consumed immediately after preparation.

The cooking vessel lid 110 may be provided in various sizes and configurations to be used in conjunction with a mating host cooking vessel 10 such as a pot, a pan, a broiler, or a casserole dish. In certain embodiments the cooking vessel lid 110 is round and configured to be used with a cylindrical-shaped the host cooking vessel 10. In other embodiments, the cooking vessel lid 110 is generally square shaped and configured to be used with a generally 3D-square shaped the host cooking vessel 10.

Figure 6:
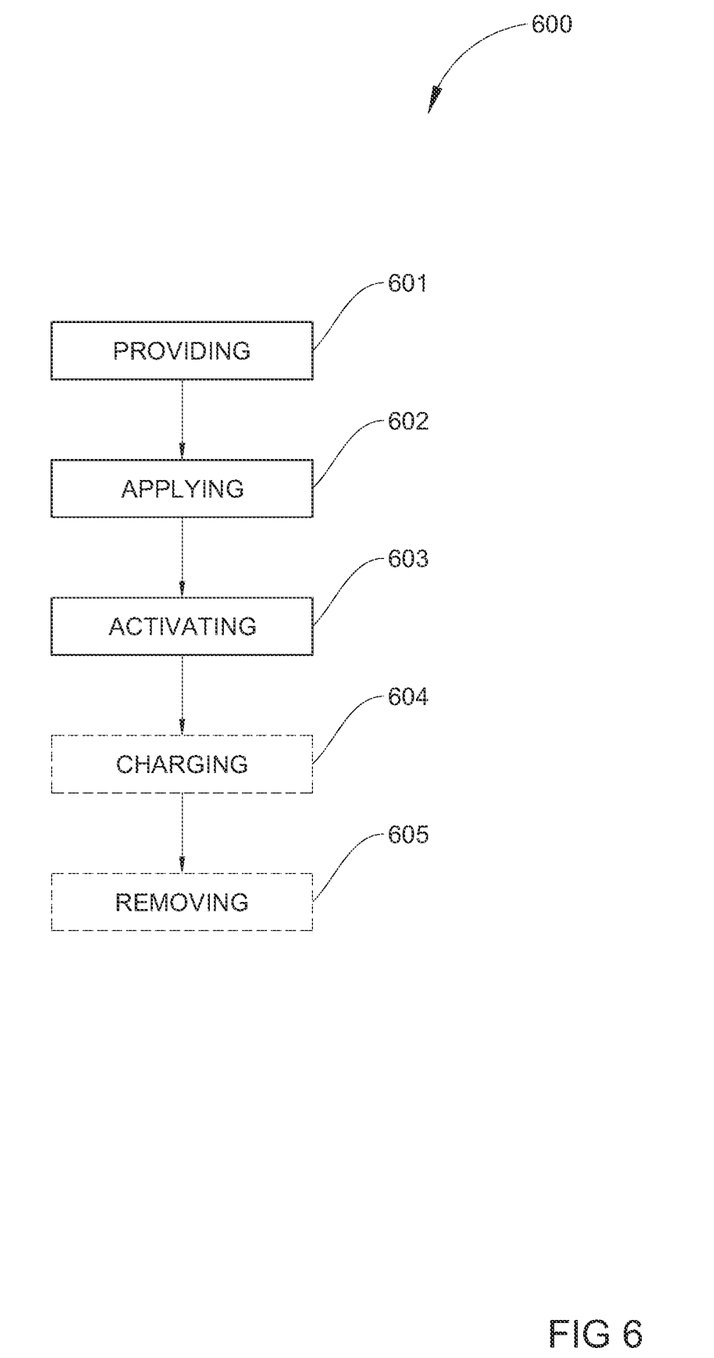
FIG. 6 is a flow diagram illustrating a method of use, according to an embodiment of the present disclosure.

FIG. 6 is a flow diagram illustrating a method for using a cooking vessel lid and fan system, according to an embodiment of the present disclosure. In particular, the method of use 600 may include one or more components or features of the cooking vessel lid and fan system 100 as described above. As illustrated, the method of use 600 may include the steps of: step one 601, providing a cooking vessel lid 110 sized and configured to cover a top portion of the host cooking vessel 10, the cooking vessel lid 110 comprising an internal fan 112 configured to eliminate excess heat contained within the host cooking vessel 10 during use, a vent system 118, an internal power source 130 configured to power the internal fan 112 of the cooking vessel lid 110, a power switch 138 for activation and deactivation of the internal fan 112, and a handle 142; step two 602, applying the cooking vessel lid 110 to the host cooking vessel 10; step three 603, activating the internal fan 112; step four 604, charging the internal power source 130; and step five 605, removing the cooking vessel lid 110 from the host cooking vessel 10.

It should be noted that steps four 604 and five 605 are optional steps and may not be implemented in all cases. Optional steps of method of use 600 are illustrated using dotted lines in FIG. 6 so as to distinguish them from the other steps of method of use 600. It should also be noted that the steps described in the method of use can be carried out in many different orders according to user preference. The use of "step of" should not be interpreted as "step for", in the claims herein and is not intended to invoke the provisions of 35 U.S.C. § 112(f). It should also be noted that, under appropriate circumstances, considering such issues as design preference, user preferences, marketing preferences, cost, structural requirements, available materials, technological advances, etc., other methods of use, are taught herein.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. A cooking vessel lid and fan system for a cooking vessel, comprising:
   a cooking vessel lid defining an internal cavity between a bottom portion of the cooking vessel lid and a top portion of the cooking vessel lid, the cooking vessel lid including:
      a rechargeable internal power source configured to power an internal fan and including:
         a power switch for activation and deactivation of the internal fan;
         a power indication light configured to illuminate when the cooking vessel lid is activated; and
         a charging port for charging the rechargeable power source;
   a handle disposed on the top portion of the cooking vessel lid;
   a vent system including:
      a top vent disposed on the top portion of the cooking vessel lid; and
      a bottom suction air vent disposed on the bottom portion of the cooking vessel lid and directing air flow through a portion of the internal cavity, the bottom suction air vent being offset from the top vent such that the bottom suction air vent is configured to exhaust out of the top vent only indirectly by directing air through the portion of the internal cavity;
      wherein the top vent is positioned radially outward from the bottom suction air vent;
   the internal fan disposed within the internal cavity and connected to the rechargeable internal power source, the internal fan configured to draw air away from an interior of the cooking vessel by pulling air into the internal cavity via the bottom suction air vent and out of the internal cavity indirectly through the top vent, the internal fan operable at a plurality of different speeds; and
   a thermometer disposed within the internal cavity and operable to determine a temperature of contents in the cooking vessel,
   wherein no vent exists directly above the bottom suction air vent.

2. The cooking vessel lid and fan system of claim 1, wherein the top vent includes a plurality of top vents disposed on a top portion of the cooking vessel lid, each top vent of the plurality of top vents being curved and oblong.

3. The cooking vessel lid and fan system of claim 2, wherein the plurality of top vents includes:
   a first set of top vents forming an inner circle on the top portion of the cooking vessel lid with each top vent of the first set of top vents being spaced apart from other top vents of the first set of top vents; and
   a second set of top vents forming an outer circle on the top portion of the cooking vessel lid with each top vent of the second set of top vents being spaced apart from the other top vents of the second set of top vents, the second set of top vents extending beyond the handle.

4. The cooking vessel lid and fan system of claim 3, wherein the bottom suction air vent is disposed as concentric circles around a center of the bottom of the cooking vessel lid, the bottom suction air vent disposed entirely within the inner circle formed by the first set of top vents.

5. The cooking vessel lid and fan system of claim 1, wherein the handle contacts the top portion of the lid at a first location and a second location, the first location and the second location being spaced apart.

6. The cooking vessel lid and fan system of claim 1, wherein the bottom suction air vent is in alignment with the internal fan.

7. The cooking vessel lid and fan system of claim 1, wherein a substantial portion of the cooking vessel lid comprises stainless steel.

8. The cooking vessel lid and fan system of claim 1, wherein the power switch is positioned on an exterior portion of the cooking vessel lid.

9. The cooking vessel lid and fan system of claim 1, wherein the handle projects from a top-center plane of the cooking vessel lid.

10. The cooking vessel lid and fan system of claim 1, wherein the cooking vessel is selected from the group consisting of a pot, a pan, a broiler, and a casserole dish.

11. The cooking vessel lid and fan system of claim 1, further comprising a set of instructions; a charging cable, and wherein the cooking vessel lid and fan system is arranged as a kit.

12. A method of using the cooking vessel lid and fan system of claim 1, the method comprising steps of:
providing the cooking vessel lid sized and configured to cover a top portion of the cooking vessel,
applying the cooking vessel lid to the cooking vessel; and activating the fan.

13. The method of claim 12, further comprising the steps of:
charging the internal power source; and
removing the cooking vessel lid from the cooking vessel.

14. A cooking vessel lid and fan system for a cooking vessel, comprising:
a cooking vessel lid defining an insulated internal cavity between a bottom portion of the cooking vessel lid and a top portion of the cooking vessel lid, the cooking vessel lid including:
a rechargeable internal power source configured to power an internal fan and including:
a power switch for activation and deactivation of the internal fan;
a power indication light configured to illuminate when the cooking vessel lid is activated; and
a charging port for charging the rechargeable power source;
a handle disposed on the top portion of the cooking vessel lid;
a vent system including:
a plurality of top vents disposed on the top portion of the cooking vessel lid, each top vent of the plurality of top vents being curved and oblong including:
a first set of top vents forming an inner circle on the top portion of the cooking vessel lid with each top vent of the first set of top vents being spaced apart from the other top vents of the first set of top vents; and
a second set of top vents forming an outer circle on the top portion of the cooking vessel lid with each top vent of the second set of top vents being spaced apart from the other top vents of the second set of top vents, the second set of top vents extending beyond the handle;
a bottom suction air vent disposed on the bottom portion of the cooking vessel lid and disposed as concentric circles around a center of the bottom of the cooking vessel lid, the bottom suction air vent disposed entirely within the inner circle formed by the first set of top vents;
the internal fan disposed within the internal cavity and connected to the rechargeable internal power source, the internal fan configured to draw air away from an interior of the cooking vessel by pulling air into the internal cavity via the bottom suction air vent and out of the internal cavity indirectly through the top vent, the internal fan operable at a plurality of different speeds, the internal fan in alignment with the bottom suction air vent; and
a thermometer disposed within the internal cavity and operable to determine a temperature of contents in the cooking vessel,
wherein a substantial portion of the cooking vessel lid comprises stainless steel,
wherein no vent exists directly above the bottom suction air vent.

15. A kit comprising:
a cooking vessel lid and fan system for a cooking vessel according to claim 14;
a set of instructions; and
a charging cable.

16. A method of using the cooking vessel lid and fan system for a cooking vessel of claim 14, the method comprising:
providing the cooking vessel lid sized and configured to cover a top portion of the cooking vessel;
applying the cooking vessel lid to the cooking vessel; and activating the internal fan.

17. The method of claim 16, further comprising a step selected from a group consisting of:
charging the internal power source; and
removing the cooking vessel lid from the cooking vessel.

18. A cooking vessel lid and fan system for a cooking vessel, consisting of:
a cooking vessel lid defining an internal cavity between a bottom portion of the cooking vessel lid and a top portion of the cooking vessel lid, the cooking vessel lid including:
a rechargeable internal power source configured to power an internal fan and including:
a power switch for activation and deactivation of the internal fan;
a power indication light configured to illuminate when the cooking vessel lid is activated; and a charging port for charging the rechargeable power source;
a handle disposed on the top portion of the cooking vessel lid;
a vent system including:
a plurality of top vents disposed on the top portion of the cooking vessel lid; and
a bottom suction air vent disposed on the bottom portion of the cooking vessel lid and directing air flow through a portion of the internal cavity, the bottom suction air vent being offset from the plurality of top vents such that the bottom suction air vent is configured to exhaust out of the plurality of top vents only indirectly by directing air through the portion of the internal cavity;
wherein the plurality of top vents are positioned radially outward from the bottom suction air vent;
the internal fan disposed within the internal cavity and connected to the rechargeable internal power source, the internal fan configured to draw air away from an interior of the cooking vessel by pulling air into the internal cavity via the bottom suction air vent and out of the internal cavity indirectly through the plurality of top vents, the internal fan operable at a plurality of different speeds; and a thermometer disposed within the internal cavity and operable to determine a temperature of contents in the cooking vessel.

\* \* \* \* \*